Jan. 11, 1944.  E. VAN ROO  2,339,122
ANTITHEFT DEVICE
Filed Jan. 31, 1942
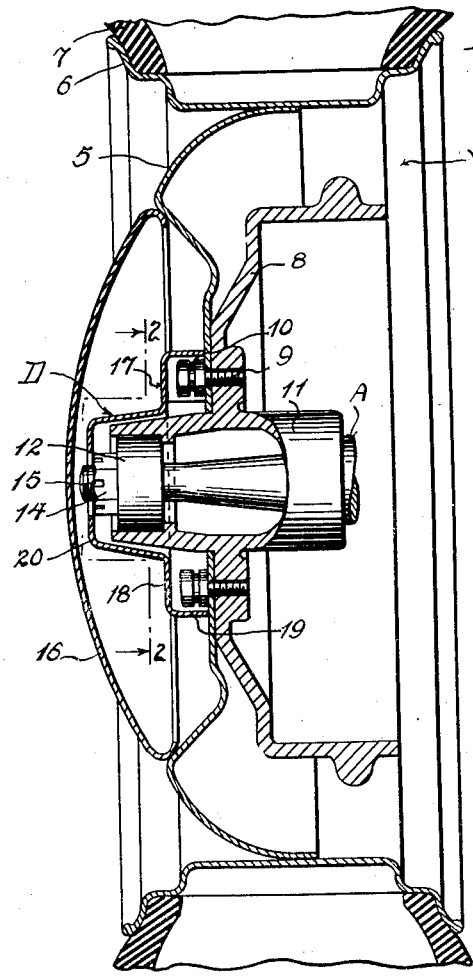
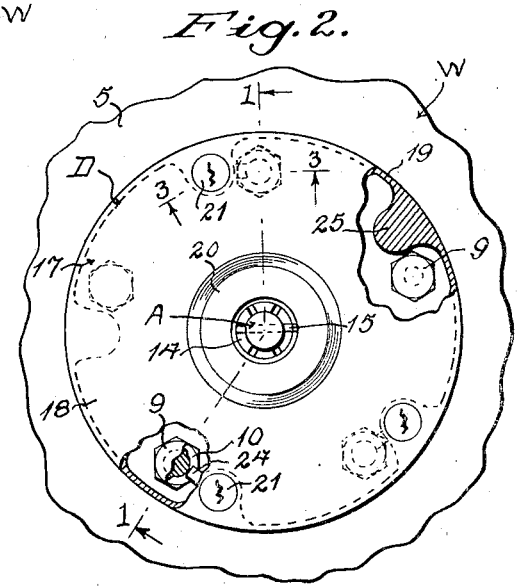
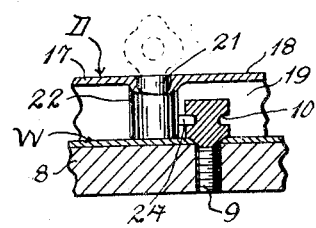
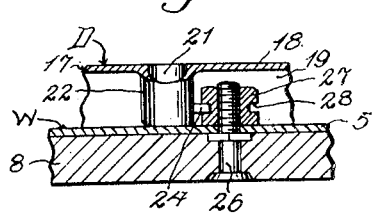
INVENTOR
ELMER VAN ROO
BY
ATTORNEYS Patented Jan. 11, 1944

2,339,122

UNITED STATES PATENT OFFICE 2,339,122

ANTITHEFT DEVICE

Elmer Van Roo, Milwaukee, Wis.

Application January 31, 1942, Serial No. 429,026

1 Claim. (Cl. 70—259)

This invention appertains to motor vehicles, and more particularly to a novel appliance for automobile wheels.

Much trouble has been experienced by automobile owners because of the theft of wheels and tires from their cars. During the present shortage of rubber, thefts have increased to an alarming extent. The tires themselves are difficult to remove from the wheels, while the wheels are still on the car. Hence, the usual method of procedure is to jack up the car and remove the wheels and carry away the wheels with the tires thereon.

It has been proposed to use lock nuts for the wheel studs or nuts, but this does not solve the problem, in that the thieves then merely remove the cotter pins and nuts from the axles and take away the entire wheel assembly, including the hubs, bearings, and brake drums.

One of the primary objects of my invention is to provide a single unitary device for each car wheel, which will effectively prevent the reaching and removing of the wheel studs or nuts and the axle nut by unauthorized persons, so as to effectively prevent the stealing of automobile wheels and tires.

Another salient object of my invention is to provide an anti-theft device for automobile wheels and tires, which can be quickly associated with standard wheels without change in their present day construction.

A further important object of my invention is to provide a removable cover for effectively housing the wheel studs or nuts and the axle nut, with means for detachably locking the cover to the studs or nuts, whereby the removal of the cover by unauthorized persons will be prevented, the cover being of such a construction that the same and the wheel will be perfectly balanced A still further object of my invention is to provide an improved device for preventing the theft of tires and wheels of the above character, which will be durable and efficient in use, one that will be simple and easy to manufacture, and one which can be placed upon the market and sold at a reasonable cost.

With these and other objects in view, the invention consists in the novel construction, arrangement, and formation of parts, as will be hereinafter more specifically described, claimed, and illustrated in the accompanying drawing, in which drawing:

Figure 1 is a sectional view through a wheel, taken on the line 1—1 of Figure 2, looking in the direction of the arrows, showing my novel antitheft device incorporated with the wheel.

Figure 2 is a sectional view taken on the line 2—2 of Figure 1, looking in the direction of the arrows, illustrating my novel anti-theft device.

Figure 3 is an enlarged, detail sectional view taken on the line 3—3 of Figure 2, looking in the direction of the arrows, illustrating the means employed for locking the device or cover to the wheel studs.

Figure 4 is a view similar to Figure 3, but showing the method employed for locking the cover to the wheel where wheel nuts are employed instead of studs.

Referring to the drawing in detail, wherein similar reference characters designate corresponding parts throughout the several views, the letter D generally indicates my novel device for preventing the unauthorized removal of a wheel W from the wheel axle A.

The wheel W and the axle A are of the usual or any preferred construction, and, as shown, the wheel includes a substantially disc-shaped body 5 carrying a rim 6 for a tire 7. The wheel body 5 is detachably secured to the brake drum 8 by means of removable stud bolts 9. These stud bolts 9 extend through the wheel body 5 and are threaded into the brake drum 8. In accordance with my invention, the heads of the stud bolts 9 have formed therein anular keeper grooves 10. In accordance with the usual practice, the brake drum 8 can be formed on the wheel hub 11, and the hub can carry suitable bearings 12 for the axle A. The hub 11 and its bearings are retained on the axle A by means of an axle nut 14. To prevent loss of the nut, a cotter pin 15 can extend through the axle. The usual hub cap 16 is employed for the wheel W.

In order to prevent unauthorized removal of the wheel from the drum 8 or the wheel, drum, and hub from the axle, I employ my novel antitheft device D. My device D includes a cover 17, which can be of circular construction, and the cover is adapted to fit on the wheel between the hub cap 16 and the wheel body 5. As illustrated, the cover 17 includes a disc-shaped body 18 having an inturned annular flange 19 for engaging the wheel body around the studs 9. The central portion of the body 18 can be depressed outwardly, as at 20, to receive the wheel hub.

Where the distance between the end of the axle 15 and the hub cap 16 is limited, the portion 20 can be cut out, so as to permit the axle end to extend therethrough. The cut-out portion, however, is sufficiently small, so as to prevent the removal of the axle nut 15. In wheels of the type where the hub does not extend through the wheel body 5, the extension 20 can be eliminated.

The body 18 of the cover carries, at spaced points, key-operated locks 21, and these locks can be of the pin tumbler type. The body of the cover can be provided with housings 22 for receiving the locks, and upon the turning of the barrel of the lock by the correct key, the bolt 24 thereof can be moved into and out of engagement with the annular groove 10 of the head of the adjacent stud bolt 9.

In the drawing, I have shown three locks, so as to prevent the prying of the cover off the wheel, but it is to be understood that the number of the locks can be varied to suit the individual manufacturer. The locks are also so disposed as to correctly balance the wheel, and, if found necessary, the cover can be provided with metal webs 25 at the correct points, if it is found that the cover is not exactly balanced.

Obviously, when the cover is on the wheel and locked to the studs, the cover cannot be removed without the use of the correct key, and unauthorized persons cannot reach the studs 9 or the axle nut 14.

In some types of wheels, removable studs are not employed, and in this type of wheel (see Figure 4), studs 26 are anchored to the brake drum. These studs 26 extend through the wheel body 5, and removable nuts 27 are threaded on the studs 26 against the wheel body for retaining the wheel in place. In this type of wheel construction, the nuts 27 are provided with annular grooves 28, and the bolts 24 of the locks 21 can engage the grooves 28 of the nuts 27 in the same manner as they engage the grooves 10 in the heads of the studs.

From the foregoing description it can be seen that I have provided an exceptionally simple and efficient device for preventing the unauthorized removal of wheels from motor vehicles.

Changes in details may be made which do not depart from the spirit and scope of my claim, and what I claim as new is:

As a new article of manufacture for preventing unauthorized removal of wheels from their hubs and hubs from their axles comprising a cover including a flat disc shaped body plate, an inturned marginal flange formed on the peripheral edge of the body plate for engaging against a wheel and for spacing the body plate from the wheel, and an outwardly extending axially disposed hollow extension formed on the body plate for engaging about a hub and an axle nut, and a plurality of independent locks carried by the body plate extending into the cover at spaced points adjacent to said flange and spaced from said extension for locking engagement with the stud bolts of the wheel.

ELMER VAN ROO.